United States Patent [19]

Morita et al.

[11] 4,290,999
[45] Sep. 22, 1981

[54] APPARATUS FOR DIRECT LIQUEFACTION

[75] Inventors: Minoru Morita; Shimio Sato; Takao Hashimoto, all of Yonezawa; Yoji Kitaoka, Ichihara, all of Japan

[73] Assignee: The President of Yamagata University, Japan

[21] Appl. No.: 90,259

[22] Filed: Nov. 1, 1979

Related U.S. Application Data

[62] Division of Ser. No. 9,828, Feb. 6, 1979.

[30] Foreign Application Priority Data

Feb. 8, 1978 [JP] Japan .............................. 53-12288

[51] Int. Cl.³ .................... B01J 8/20; B01J 10/00; G10G 1/08
[52] U.S. Cl. .................... 422/194; 422/190; 422/196; 422/214
[58] Field of Search .............. 208/8 LE, 10; 422/190, 422/194, 196, 214, 189

[56] References Cited

U.S. PATENT DOCUMENTS 2,913,388 11/1959 Howell et al. ..................... 208/10
3,644,192 2/1972 Li et al. .............................. 208/8 LE
4,189,371 2/1980 Maa et al. ............................ 208/10

OTHER PUBLICATIONS

"Coal Hydrogenation Process", Callaham, Chem. Eng., 6-1952, pp. 152-157.

Primary Examiner—Bradley Garris
Attorney, Agent, or Firm—Robert E. Burns; Emmanuel J. Lobato; Bruce L. Adams

[57] ABSTRACT

In a process for directly liquefying coal, a paste consisting of finely divided coal, catalyst and heavy oil can be treated for thermal cracking and hydrocracking with a high liquid/space ratio and short residence time in a preheating section and a reaction section. An apparatus threfor comprises a plural number of pipe units having apertures for hydrogen injection and apertures for the paste of a low concentration or heavy oil injection and a gas-liquid separator for removing $H_2O$, methane, etc., the pipe units being formed in such a manner that a Reynolds number of $3 \times 10^3$ or greater and an axial dispersion coefficient of 0.05 or smaller are achieved for the fluid flow therein.

6 Claims, 3 Drawing Figures (k = RATE CONSTANT, $\tau$ = RESIDENCE TIME)

APPARATUS FOR DIRECT LIQUEFACTION

This is a divisional of application Ser. No. 009,828, filed Feb. 6, 1979.

FIELD OF THE INVENTION

The present invention relates to a process for directly liquefying coal with a high liquid/space ratio (treated paste volume per time/volume of a reactor) and apparatus therefor.

BACKGROUND OF THE INVENTION

It is known as the Bergius process to obtain liquefied crude oil by the hydrocracking of a preheated paste consisting of finely divided coal, catalyst and heavy oil under an elevated temperature and pressure.

For carrying out the Bergius process practically, there have been practically employed so-called continuous tubular reactors. However, in any such tubular reactors, the residence time of paste within its respective tube is as long as approximately one hour, namely, the liquid/space velocity is about one and a complete mixing is carried out within the reactor by the agitation due to hydrogen injection.

It is obviously advantageous to carry out a reaction with a high liquid/space ratio as more paste can be treated in a reactor of the same volume. To achieve a high liquid/space ratio, in other words, to shorten the residence time, it is necessary to conduct a reaction at an elevated temperature and in a short period of time.

Conventional reactors for direct liquefaction of coal were of the type of complete mixing vessels. It is theoretically known that an ideal tubular reactor can increase the liquid/space ratio of a first order reaction by 4 times and that of a second order reaction by 10 times compared with those in a complete mixing vessel when the reaction velocity constant is identical.

Since the direct liquefaction reaction of coal is a first order reaction, it is theoretically possible to reduce the residence time by one tenth to one twentieth with respect to that in a conventional reactor if the reaction temperature is somewhat raised.

The present inventors have achieved success in directly liquefying coal with a high liquid/space ratio by improving a tubular bubble tower type reactor and have achieved the present invention.

It has been known that, in fluid flow within a tube, there are considerable differences in the manner of mixing between fluid flow of a Reynolds number of $3 \times 10^3$ or greater (turbulent flow range) and that of a smaller Reynolds number of $10^1$–$10^3$ regardless of whether the fluid is a liquid phase or gaseous phase.

In a fluid flow of a Reynolds number of $3 \times 10^3$ or greater, the flow is a plug flow or quasi plug flow, and mixing in the flow direction is very little but the flow in the radius direction is completely mixed.

In considering the back mixing flow, the extent of back mixing (back mixing degree) is represented by the following equation;

$$\text{back mixing degree} = D/ud$$

wherein u: liquid flow velocity; d: tube diameter; and D: diffusion constant of back mixing. The back mixing degree ranges $10^1$–$10^5$ with a Reynolds number of $10^2$ to $0.2 \times 10^3$ while it ranges from 0.2 to 0.7 with a Reynolds number of $10^4$ to $10^5$.

DESCRIPTION OF INVENTION

Figure 1:
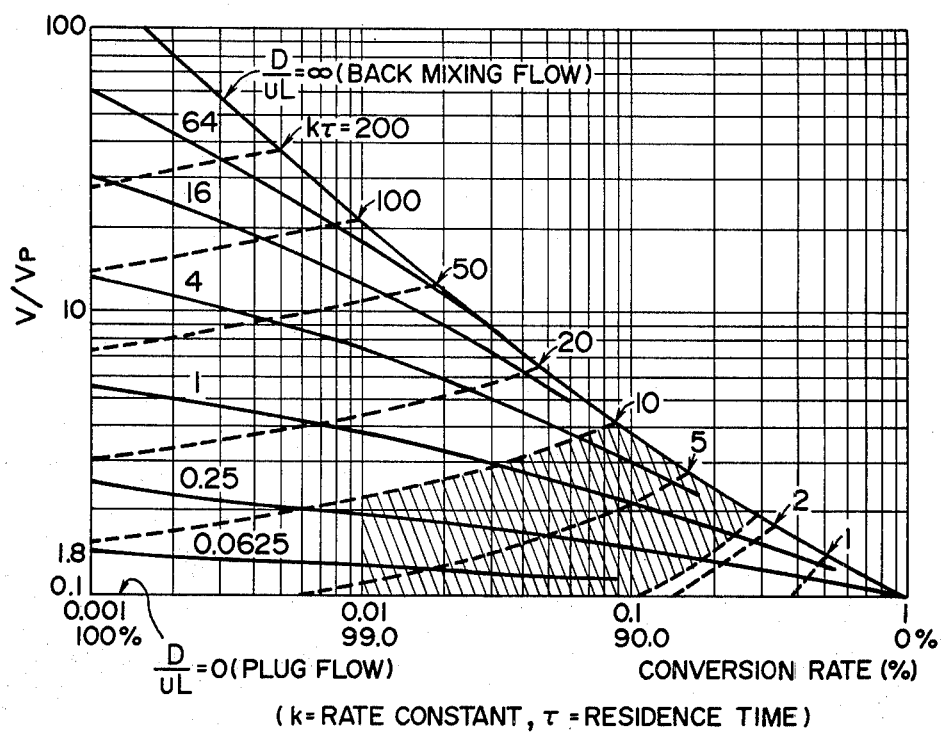
FIG. 1 is a diagram showing the relationship between conversion rate and V/Vp (tank flow/plug flow)

In the present invention, a Reynolds number and the value of $D/u \cdot d/L$ (wherein, L denotes the whole length of a reaction tube) are set at $3 \times 10^3$ or greater and not more than 0.05 respectively so as to subject a third flow within a tube to a reaction in a turbulent flow region of a plug flow or quasi plug flow and within the hatched area in FIG. 1.

In the conventional direct liquefaction reaction of coal, so-called tubular reactors were occasionally employed, but there were few examples in which the Reynolds number of the fluid flow within a tube was taken into consideration and reactors of a mere tubular or tortuous tubular configuration were used.

In view of the above fact, the present invention provides a process for carrying out a reaction by hydrocracking a paste consisting of finely divided coal, catalyst and heavy oil in a hydrogen gas atmosphere under a pressure of 120 to 700 kg/cm² and at a temperature of 350° to 500° C., wherein a reactor which comprises a plural number of pressure resistant vertical pipes and which contains a preheating section and a reaction section is employed; said paste is heated in the preheating section to a temperature between 380° C. to 410° C. and simultaneously preheated hydrogen gas is charged into the preheating section so as to achieve the combined hydrogen gas and paste velocity of $3 \times 10^3$ or greater in terms of Reynolds number and also so as to achieve the axial dispersion coefficient (D/uL) of not greater than 0.05; the thus-preheated paste is then forwarded to the reaction section where said preheated paste is heated to a temperature of 400° to 500° C., and into which reaction section preheated hydrogen gas is charged at several locations and a small amount of a dilute paste or heavy oil may be charged if necessary in order to create a fluid flow of the combined hydrogen gas velocity and the flow velocity of the thus-heated paste of $3 \times 10^3$ or greater in terms of Reynolds number and of an axial dispersion coefficient (D/uL) of not greater than 0.05, thereby carrying out the reaction under conditions indicating a plug flow or quasi plug flow. Thus, the back mixing degree (D/ud) is extremely small.

Total amount of required hydrogen is set at 1 to 3 times the stoichiometrically required hydrogen quantity and the liquefaction reaction is conducted with a liquid/space ratio of 4–20.

As a reactor suitable to maintain the above described flow conditions, the following reactor may be employed:

An apparatus comprising a preheating section formed with a plural units of pipes, each unit including a gas-liquid ascendant pressure resistant (resistant to a pressure up to 500–700 kg/cm²) vertical pipe and a gas-liquid descendant pressure resistant vertical pipe;

a reaction section formed with a plural units of pipes, each unit including a gas-liquid ascendant pressure resistant (resistant to a pressure up to 500–700 kg/cm²) vertical pipe, a gas-liquid descendant pressure resistant vertical pipe and a high pressure gas-liquid separator disposed between said ascendant and descendant pipes; a high pressure separator; a condenser for crude oil of a low boiling point; and a condensor for crude oil of a high boiling point, in which the axial dispersion coefficient (D/ul) is not greater than 0.05 and the diameter ratio of the descendant pipe to its respective ascendant pipe ranges from 0.5 to 0.85.

In a more preferred embodiment, the diameters of the gas-liquid ascendant pipes gradually decrease and the diameter ratio of the ascendant pipe in the $n^{th}$ unit to that in the (N+1) unit is from less than 1 to 0.7.

It is the first feature of the present invention to use a tubular reactor having such a structure as described above.

In the past, no one proposed a tubular reactor in which the diameter of pipe units gradually decreases or a tubular reactor in which the diameter ratio of an ascendant pipe to its respective descendant pipe is different from each other. It has been found from experimental results that coal can be smoothly directly liquefied with a high liquid/space ratio by means of a tubular reactor of such a structure as described in the immediately preceding sentence.

Figure 2:
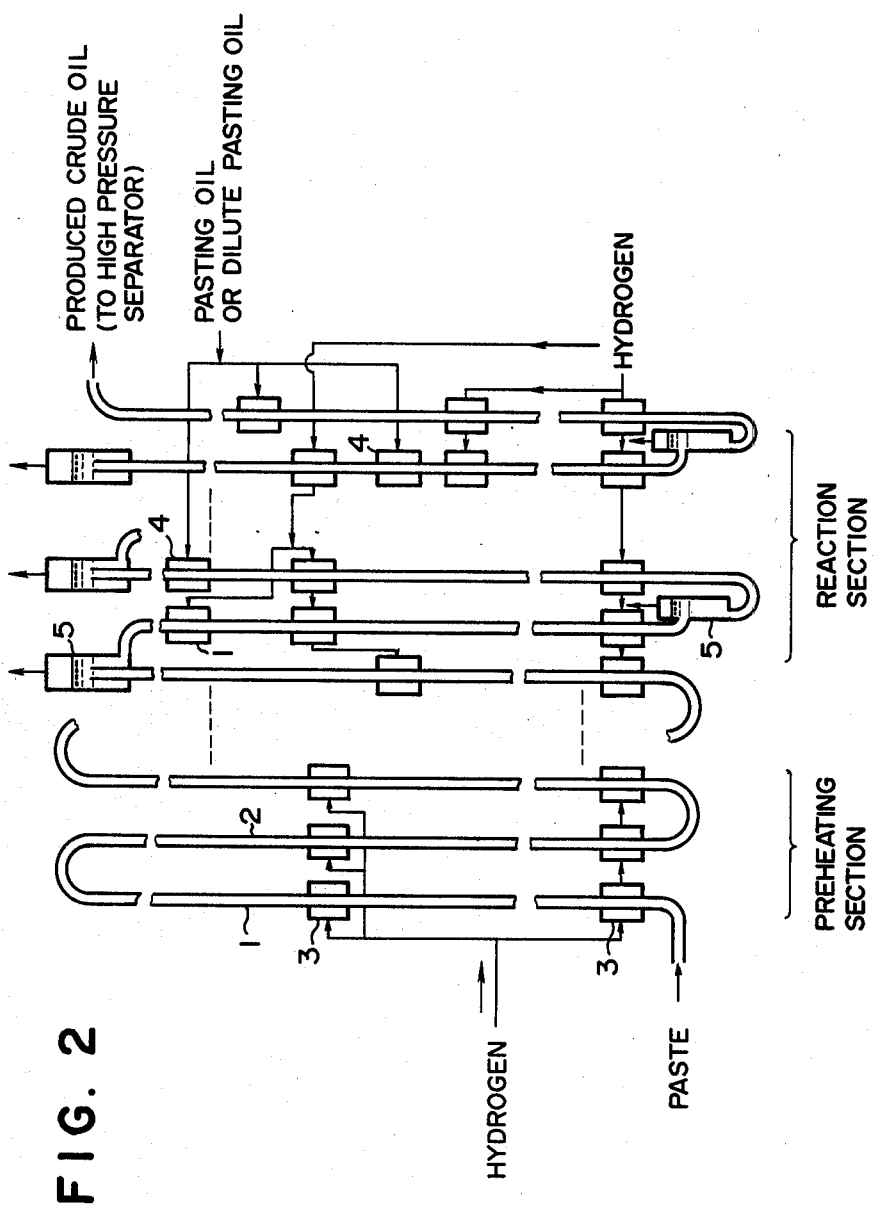
FIG. 2 is a system chart showing an apparatus suited for practicing the process according to the present invention.

In the reactor shown in FIG. 2, the descendant pipe 2 has a different diameter from that of the ascendant pipe 1. The diameter ratio of a vertical descendant pipe to its corresponding vertical ascendant pipe is from 0.5 to 0.85, and preferably from 0.6 to 0.8.

The reason for differentiating pipe diameters as described above is that the void ratio of hydrogen gas bubbles becomes identical in an ascendant pipe and its respective descendant pipe thereby being capable of maintaining the same hydrogen gas bubble conditions in both an ascendant pipe and its respective descendant pipe as the hydrogen gas bubbles rising within an ascendant pipe has an ascending velocity which is the combination of the floating force of the bubbles and the fluid flow velocity whereas the hydrogen bubbles moving down within a descendant pipe travel downwardly with a velocity which is the subtraction of the floating force of the bubbles from the fluid flow velocity. In other words, it is possible to design a reactor with a view to always maintaining a void ratio of 10 to 30% in both ascendant and descendant pipes. This is the second feature of the present invention.

The third feature of this invention resides in the provision of distributed charging and discharging locations of hydrogen. Namely, it is not desired to charge from one location in the reaction section, required whole hydrogen which is about 1-3 times the amount stoichiometrically required although the hydrogen gas is under high pressure of 120-700 kg/cm$^2$, as it causes an excessively large mass of hydrogen gas and a bubble flow is not formed but a slug or circular flow is resulted. In the method described in U.S. Pat. No. 3,644,192 issued Feb. 22, 1972 to Li et al, hydrogen gas is separately charged at the bottom portion of either one of each vertical ascendant and descendant pipe unit to solve such problems. However, the present invention is characterized in that, in order to maintain a more stable and homogeneous fluid flow, a required amount of hydrogen gas is charged into the reactor through at least two openings, or 10 to 40 openings if necessary, formed through the wall of an ascendant or descendant pipe as well as any excess hydrogen gas and gas product are discharged by means of a gas-liquid separator provided with each ascendant pipe at the top thereof.

The fourth feature of this invention resides in the charging of paste of low concentration or heavy oil for the purpose of controlling the reaction temperature. In a direct liquefaction reaction system of coal, the temperature rises rapidly as the reaction proceeds, since 500-600 kcal is exothermically generated per kilogram of coal. In such an exothermic reaction, the reaction temperature control in a conventional method was carried out by charging a great amount of coal and hydrogen gas into the reaction pipes at the latter zone thereof.

In another conventional method, paste or heavy oil was charged into reaction pipes. However, the inventors are not aware of any attempt in which heavy oil or paste of dilute concentration was charged through openings formed in the pipe walls.

In the method of this invention, hydrogen gas, past of low concentration or heavy oil is charged through openings formed in pipe walls. It has been observed that the thus-charged hydrogen gas, paste of low concentration or heavy oil distributes in the radius direction of the respective pipe immediately after the charging thereof as the mixing in the radius direction is complete mixing, while there exists only slight back mixing in the axial direction due to the fact that the fluid flow is plug flow.

In the fluid charging method through a pipe wall according to this invention, a portion of a tubular reactor is formed with a double walled pipe. Small apertures are formed through the inner pipe wall in a row along the circumference of the circular pipe, in a zig-zag pattern or in several rows in which apertures are aligned longitudinally and transversely. Hydrogen gas, dilute paste or heavy oil enters the cavity between the inner and outer pipes of the double-walled pipe and then penetrates into the inner pipe through a plurality of apertures formed in the inner pipe.

An example of the aperture arrangement is shown in FIG. 2. According to conventional methods, gas is charged into a reactor from the upper or lower extremity of a vertical pipe through a multi-porous plate made of ceramic or glass. Such prior art methods did not introduce into a reactor paste of low concentration or a heavy oil for temperature control. It is particularly undesirable to dispose, within a reactor pipe, a pipe for charging hydrogen gas, paste of low concentration or heavy oil or such a multi-porous plate as described above, since such additional members would disturb the flow within the reactor pipe and also create some flow zones which are not in the form of a plug flow.

Reactor designing has been rendered easy by applying the technique of this invention that hydrogen gas, paste of low concentration or heavy oil is charged into the reactor through the apertures 3, 4 formed in the pipe wall as such apertures can be formed at any locations of the pipe.

The reactor pipes of the present invention are formed by joining in series a great number of vertical double-walled pipes. As shown in FIG. 2, a gas separator 5 is provided with each vertical pipe at the upper and lower extremity thereof for the separation of gas products and excessive hydrogen gas. For example, in case that coal is directly liquefied under 200 atmospheric pressure and at a temperature of 400°-440° C., gas products (for example H$_2$O methane and ethane), gasoline and a portion of lighter oil are separated by the above-described separator 5 as the reaction proceeds, and remaining unreacted portions (paste, asphalten, and light, middle heavy and heavy oil) are allowed to travel in a fluid state in the reactor pipes.

While injecting the preheated hydrogen gas through a plurality of openings in the pipe walls as described above, lighter gases such as H₂O, CH₄, gasoline, etc. together with excess hydrogen gas are separated from other reaction products and remaining unreacted portions. The excess hydrogen gas is recycled to the preheating section together with added hydrogen gas.

In the reaction section of the apparatus according to the invention, the diameters among each pipe unit gradually decrease in size in the travelling direction of fluid, because, with pipes of identical diameters, the velocity of the oil phase decreases or becomes zero due to reduced oil portion. The oil phase does not travel effluently within the vertical ascendant pipe 1 and the oil surface is kept at or below the midpoint of each pipe, as the direct liquefaction reaction of coal proceeds. This phemomenon is called "evaporation" which causes the formation of coke and cracked gas which is the main cause for operation suspension. The above-described pipe diameter ratio of the ascendant pipe in an $n^{th}$ unit to that in an $(n+1)^{th}$ unit, namely, the pipe ratio of less than 1 to 0.7 was determined experimentally.

The fifth feature of the present invention is to charge a paste of a low concentration or heavy oil, which have been preheated to a substantially same temperature as the reaction fluid, in an amount to compensate the paste (present in the form of asphalten in the reaction) which has been lost due to gasification. The rate of gradual pipe diameter reduction can be determined depending on reaction type. In the reactor of the present invention, the pipe diameters gradually decrease from one pipe unit to the next pipe unit. As the reaction fluid approaches the outlet of the reactor, gaseous reaction products are removed and reaction products in the form of liquid decreases in quantity. Thus, reaction pipe diameters are gradually rendered smaller, in other words, the cross-sectional areas of reaction pipes gradually decrease toward the outlet of the reactor, in order to maintain a substantially constant in-pipe flow velocity so as to change the amount of the reaction fluid from one pipe to another pipe, thereby maintaining an effluent flow at the upper extremity of each vertical pipe.

The sixth feature of this invention is to conduct the dissolution of hydrogen gas as well as the further preheating of a paste by charging preheated hydrogen into a preheated paste. The preheating of a paste consisting of finely divided coal, a catalyst and heavy oil is carried out very fast as the preheating up to 300° C. does not cause any reaction. However, at a temperature over 300° C., the amount of hydrogen to be charged is an approximately stoichiometrically required quantity as the heating is done by utilizing the reaction heat generated from the dissolution reaction and hydrogenation reaction of the hydrogen to be charged into the preheating section. During such reactions, it is not necessary to provide gas-liquid separators as hydrogen is not excessive and only little gas and water products are formed. A few gas-liquid separators may, however, be provided. At a region of 300°-about 350° C. to 380°-410° C. in the preheating section, the gas-liquid fluid practically forms a plug flow in the vertical preheating pipes and hydrogen is charged into the pipes through the apertures formed therein. The hydrogen is charged in the form of bubbles which evenly distribute in the pipes thereby forming a completely mixed gas-liquid flow.

An embodiment according to the present invention is illustrated as follows:

Preheating section [300° C. - (380° -410° C.)]

preheated paste ⟶ gas-liquid ascendant pipe 1 ⟶
(below 300-350° C.)    [preheating (1)]

gas-liquid descendant ⟶ gas-liquid ascendant pipe 1
pipe 2
[preheating (2)]    [preheating (3)]
(to reaction section)

Reaction Section [400° C.-500° C.]

⟶ gas-liquid ascendant ⟶ gas/liqiud separator 5
   pipe 1                  [1-(2)]
   [1-(1)]

⟶ gas-liqiud descendant ⟶ gas/liquid separator 5
   pipe 2
   [1-(3)]                 [2-(2)]

⟶ gas-liquid ascendant ⟶ ... gas/liquid separator 5
   pipe 1
   [2-(1)]                 [n-(2)]

⟶ gas-liquid descendant ⟶ *
   pipe 2                  (cont'd to below)
   [n-(3)]

Namely, a fluid travels in the following sequence:
preheating (1), preheating (2), preheating (3),
preheating (4),    1-(1), 1-(2), 1-(3),
2-(1), 2-(2), 2-(3), 3-(1), 3-(2),
3-(3)    , n(1), n(2), n(3), then

* ⟶ high pressure separator
(cont'd from above)

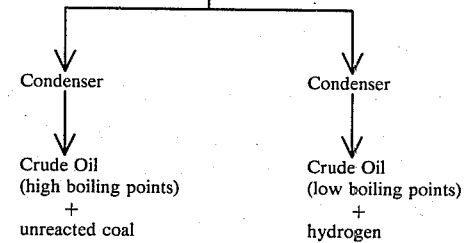

Condenser                Condenser

Figure 3:
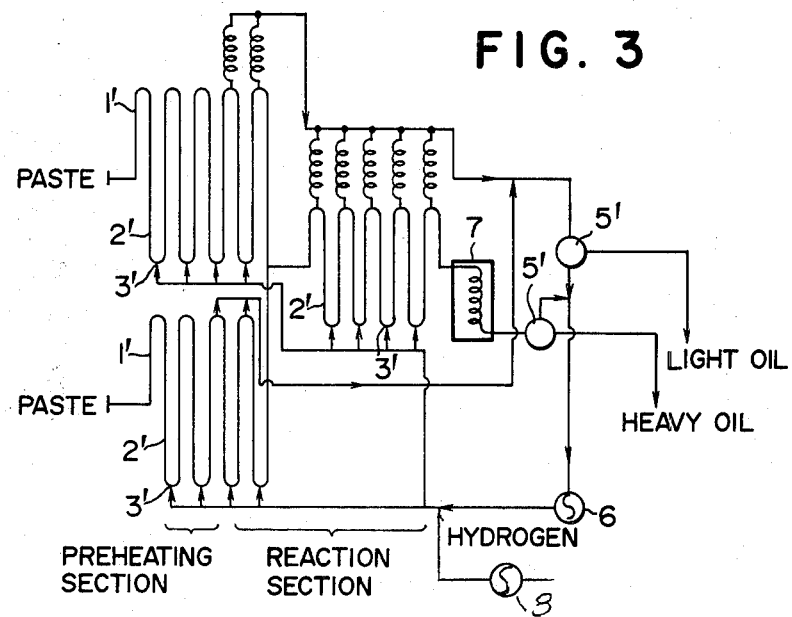
FIG. 3 is a flow diagram of another embodiment of the apparatus according to this invention.

Crude Oil                Crude Oil
(high boiling points)    (low boiling points)
+                        +
unreacted coal           hydrogen Another modification of the present invention is as follows:

As shown in FIG. 3, in the reaction section, it is possible to combine two or several units into one unit or less-numbered units. In the present invention, at a reaction temperature of 400° C. or higher, a portion of reaction products is gasified and the light oil fraction and water product are also converted into gaseous states. Therefore, the volume of reaction substances in the reactor decreases gradually. Accordingly, it is feasible to reduce the diameters of pipes gradually or to adapt a pipe of a large diameter by combining several pipe units from certain intermediate point in the reactor to increase the amount of liquid.

In the present invention, hydrogen gas, which has been preheated to a reaction temperature or higher, or heavy oil (mixed oil) or a paste of a low concentration which is of relatively low temperature is charged through apertures formed in gas-liquid ascendant and descendant pipe walls at suitable locations. Within the gas-liquid ascendant and descendant pipes, a hydrocracking reaction proceeds. Gaseous products, oil products having low boiling points and excessive hydrogen gas are separated by means of a gas/liquid separator 5' via a condenser 7. The thus-separated excessive hydrogen gas is recycled by a circulator 6 to the preheating section, together with newly added fresh hydrogen gas supplied by a compressor 8. The preheated paste enters the reaction section with a preheated temperature of 380°–410° C. The reaction temperature arises due to its exothermic nature and reaches a predetermined maximum temperature. During the reaction with a view to avoiding an uncontrollable reaction, it is possible to charge heavy oil or a paste of a low concentration of a relatively low temperature to maintain the reaction under control.

Apertures 3' through which hydrogen is charged, which charging is one of the features of this invention, are formed through a gas-liquid ascendant pipe 1' and a gas-liquid descendant pipe 2' at suitable locations thereof, for example, with a distance of 3–10$^m$, along the circumference thereof, in one or two rows, and in the shape of crossed slits or a square of 0.25–0.5 cm in diameter. Two to about 50–60 apertures may be formed. The hydrogen bubbles from such apertures formed in a pipe wall are drawn into the paste in the form of small bubbles due to a turbulent flow of the paste and such small bubbles of hydrogen distributed into the paste react therewith. On the other hand, the heavy oil or paste of a relatively low concentration for controlling the reaction temperature enters the pipe through apertures formed in the pipe. Such heavy oil or paste breaks up homogeneously in the radial direction of the pipe and its main purpose of controlling the reaction temperature is thus achieved.

In the present specification, the term "coal" shall include not only brown coal and bituminous coal but also lignin powder.

The comminution degree of the raw material coal is desirably less than 100 mesh, and the coal concentration in a paste is 10 to 50% by weight, preferably 30 to 45% by weight. The catalyst may be selected from red mud iron oxides, iron hydroxides, iron sulfides, sulphur, molybdenum oxides, molybdic acid, and oxides, hydroxides, halides, cyanides and the like of tin, zinc, chromium, nickel and the like. The catalyst may be used at a concentration of 0.1–5% by weight of coal. As heavy oil, it is possible to use heavy oil fractions of a boiling point of 300° C. or higher from hydrocracked crude oil product. The reaction temperature and pressure varies depending upon the nature of raw material coal, but a temperature of 350° to 500° C. and a pressure of 120 to 700 kg/cm$^2$, which are the same as the reaction conditions for conventional direct liquefaction of coal, may be employed.

The heating of a reactor may be done by either one of combustion flue gas, electrical heatings and a molten salt.

The features of the present invention may be summarized as follows:

(1) The flow velocity within a pipe always has a Reynolds number of $3 \times 10^3$ or greater, and the axial dispension coefficient (D/uL) is not greater than 0.05;

(2) The reaction takes place in both ascendant and descendant pipes. To maintain the flow velocity within the above Reynolds number and axial dispension coefficient ranges by a setting the diameter ratio of a descendant pipe to its corresponding ascendant pipe at not greater than 1 (0.5–0.85) and also by gradually reducing the diameter of the gas-liquid ascendant pipe in each pipe unit in the travelling direction of the fluid or combining near the final region of the reaction section two units or several units into one or less-numbered units respectively; and (3) By fully utilizing the features of the tubular reactor which comprises a preheating section wherein apertures are formed for charging hydrogen through pipes which are not equipped with a gas/liquid separator as well as a reaction section wherein introductory apertures for hydrogen and heavy oil or a low concentration paste are formed through pipes which are equipped with a gas/liquid separator, to obtain liquefied crude oil with a high liquid/space ratio.

The present invention will be further explained in reference to the following examples but it shall not be limited thereto.

EXAMPLE 1

In a tubular reactor comprising a preheating section which includes a repetition of a combination unit of a gas-liquid ascendant pipe and a gas-liquid descendant pipe as well as a subsequent reaction section which includes a repetition of a combination unit of a gas-liquid ascendant pipe, gas/liquid separator and gas-liquid descendant pipe, to use five 20 m/m pipes as the ascendant pipes, five 17 m/m pipes as descendant pipes in the preheating section, the length of each pipe being 10 m; in the reaction section to use in each of the first pipe unit to the fourth pipe unit a 20 m/m ascendant pipe and a 17 m/m descendant pipe, in each of the fifth and sixth pipe units a 19 m/m ascendant pipe and a 16 m/m descendant pipe, in each of the seventh and eighth pipe units an 18 m/m ascendant pipe and a 15 m/m pipe, in the ninth pipe unit a 17 m/m ascendant pipe and a 14 m/m descendant pipe and in the 10th pipe unit a 16 m/m ascendant pipe and a 13 m/m descendant pipe, and each pipe length being 10 m.

A paste consisting of 40% by weight of finely divided coal of not larger than 100 mesh, 1% by weight as iron sulphides of iron hydroxides and sulphur and as heavy oil hydrocracked heavy oil obtained by removing fractions of a boiling point of 300° C. or lower from hydrocracked oil is charged at a fluid velocity of 470 kg/hr. The combined velocity of the paste and hydrogen is selected to a yield a Reynolds number of $3 \times 10^3$ or greater and an axial dispersion coefficient (D/uL) of 0.05 or lower. The preheating pipes (pressure resistant special steel pipe unit) are externally heated by gas to heat the paste to 300 atoms and 300° C. at the inlet of the preheating section and to 290 atoms and 400° C. at the outlet of the preheating section. Into each preheating pipe, hydrogen gas is fed through apertures formed in its respective pipe wall at a velocity of 15 l/hr in the standard state. A slight reaction takes place there and hydrogen is consumed at a rate of about 1.2% by weight of the coal. The paste mostly turned to a asphalten-like fluid.

In the reaction section (including pressure resistant special steel pipe unit), apertures were formed at 40 locations through the pipes. At each location 20 apertures of a 0.5 m/m diameter were formed along the respective circumference. Hydrogen gas was blown into the pipes at a flow velocity of 4 m$^3$/hr on average in the standard state at each location. More hydrogen was absorbed as the paste travelled from a lower temperature region (400° C., 290 atoms) adjacent the inlet of the reaction section to the higher temperature region (440° C., 270 atoms). More hydrogen was absorbed in the ascendant pipes than in the descendant pipes. Accordingly, at the inlet region of the reaction section, hydrogen was charged into each ascendant pipe at a flow velocity of 3.5 m$^3$/hr and into each descendant pipe at a flow velocity of 2.5 m$^3$/hr, both in the standard state. On the other hand, at the outlet region of the reaction section, hydrogen was blown into the ascendant pipes at a flow velocity of 7 m³/hr and into the descendant pipes at a flow velocity of 5 m³/hr. A Reynolds number of $1.1 \times 10^4$ and an axial dispersion coefficient of $0.5 \times 10^{-4}$ were observed for the fluid flow within the reaction pipes at the above reaction temperature and under the above reaction pressure. To maintain the reaction temperature within a temperature range of 430° to 440° C., in the reaction section, a paste containing coal at a concentration of 10% by weight was introduced into the reaction pipes at two locations, at each of which locations 20 apertures were formed, through the pipe walls at a flow velocity of about 10 kg/hr. The Reynolds number and axial dispersion coefficient remained unchanged.

Thus, about 182.36 kg of oil products were obtained from 188 kg (470×0.4) of coal (97% yield). The liquid/space velocity was about 10. From 470 kg/hr of the paste containing 40% by weight of coal therein, there were obtained 300 kg/hr of heavy oils containing unreacted solid portions, 196 kg/hr of heavy and light oils, 14.4 m³/hr of gaseous products and 18 l/hr of water product.

Subsequent to the removal of the unreacted solid portions by virtue of centrifugal separation, the heavy oil was again used as heavy oil (mixed oil) for preparation of a paste.

EXAMPLE 2

A tubular reactor, which comprises a preheating section (I) including a repetition of a combined unit of a gas-liquid ascendant pipe and a gas-liquid descendant pipe and a reaction section (II) including a repetition of a combined unit of a gas-liquid ascendant pipe, gas liquid separator and a gas-liquid descendant pipe, and another tubular reactor which comprises a preheating section (I') and a reaction section (II'), were combined together and then another reaction section (III) was joined to carry out a reaction. In the preheating sections (I, I'), each ascendant and descendant pipes had diameters of 20 m/m and 17 m/m respectively, and was 10 m long. Five of such ascendant pipes were employed and the same number of such descendant pipes were also used (10 m×10 pipes). In the reaction sections (II, II'), eight 20 m/m to 17 m/m ascendant pipes and eight 17 m/m to 14 m/m descendant pipes were used. The pipe diameters gradually decreased among the same types of pipes. Each pipe was 10 m long (10 m×16 pipes). In the reaction section (III), two 21 to 17 m/m ascendant pipes and two 18 to 14 m/m descendant pipes were used. Between the same types of pipes, the first pipes were thicker than their respective second ones. Each pipe was 10 m long (10 m×4 pipes). The outlet of the reaction section (III) was connected to a high pressure separator and a condenser.

A paste of 40 weight % coal concentration was charged into each of the preheating sections (I, I') at a flow velocity of 452 kg/hr. In each of the preheating sections (I, I'), the paste was preheated to 360° C. to 400° C. with a residence time of 3 minutes. In the reaction sections (II, II'), the thus-preheated paste was carefully reacted to reach a temperature of 400° C. to 430° C. and in the reaction section (III) the reaction was carried out by introducing a slight quantity of heavy oil through apertures formed in the pipe walls to control the reaction temperature so as to reach a temperature of 430° to 460° C. Hydrogen gas was blown into the preheating sections (I, I') through apertures formed in the pipe walls at 10 locations. At each location, there were 20 apertures. The total quantity of the charged hydrogen was 20 m³/hr in the standard state. In other words, hydrogen was charged at a flow velocity of 2 m³/hr at each location. In the reaction sections (II, II'), hydrogen was fed at 36 locations at a flow velocity of 6 m³/hr on average per location. In the reaction section (III), hydrogen was charged at 8 locations at a flow velocity of 6.4 m³/hr on average per location.

The flow velocity of the fluid flow in the preheating and reaction sections (the combined velocity of hydrogen and the paste) was $1.2 \times 10^4$ in terms of Reynolds number at the above temperatures and under the above pressures. With 452 kg/hr of the paste flow velocity, there were obtained 37 kg/hr of water, 36 m³/hr of gas, 244 kg/hr of light weight oils including gasoline and 543 kg/hr of heavy oils. The liquid/space ratio was about 10.

What is claimed is:

1. An apparatus adapted for direct liquefaction of coal, comprising a preheating section including a plural number of first pipe units, each first pipe unit being formed with a pressure resistant vertical gas-liquid ascendant pipe and a pressure resistant vertical gas-liquid descendant pipe and said first pipe units forming through respective pipe walls at several locations in both ascendant and descendant pipes thereof apertures for a hydrogen injection; a reaction section including a plural number of second pipe units, each second pipe unit being formed with a pressure resistant vertical gas-liquid ascendant pipe, a pressure resistant vertical gas-liquid descendant pipe and a high pressure gas/liquid separator disposed between said ascendant and descendant pipes, and said second pipe units forming through respective pipe walls at several locations in both ascendant and descendant pipes thereof apertures for a hydrogen injection and apertures for a paste of a low concentration or heavy oil injection, a high pressure separator, a first condensor for crude oils of low boiling points and a second condensor for crude oils of high boiling points, each of said first and second pipe units being formed in such a manner that a Reynolds number of $3 \times 10^3$ or greater and an axial dispersion coefficient (D/uL) of 0.05 or smaller are achieved for the fluid flows therein; and the pipe diameter ratio of a descendant pipe to an ascendant pipe is from 0.5 to 0.85.

2. The apparatus according to claim 1, wherein the pipe diameters gradually decrease in the flow direction of a fluid from one pipe to a subsequent pipe and the diameter ratio of the ascendant pipe in an $n^{th}$ pipe to that in the $(n+1)^{th}$ pipe is from 1 to 0.7.

3. The apparatus according to claim 1, wherein in each of the plural numbers of the first and second pipe units, two or more pipe units are combined into one unit.

4. The apparatus according to claim 1, wherein apertures for hydrogen injection are provided at a plurality of locations in each ascendant pipe of said second pipe units of said reaction section.

5. The apparatus according to claim 1, or 4, wherein apertures for hydrogen injection are provided at a plurality of locations in each descendant pipe of said second pipe units of said reaction section.

6. The apparatus according to claim 1, wherein said gas/liquid separators are provided at both upper ends and lower ends of said pipes of said second pipe units.

* * * * *